US009716777B2

(12) United States Patent
Roberts et al.

(10) Patent No.: US 9,716,777 B2
(45) Date of Patent: *Jul. 25, 2017

(54) RADIO FREQUENCY PROPERTIES OF A CASE FOR A COMMUNICATIONS DEVICE

(71) Applicant: Tech 21 Licensing Limited, Twickenham (GB)

(72) Inventors: Jason Lloyd Roberts, Twickenham (GB); Wilhelm Marschall, London (GB); Benjamin Richard Thorpe, Uxbridge (GB)

(73) Assignee: TECH 21 LICENSING LIMITED, Twickenham (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/050,973

(22) Filed: Feb. 23, 2016

(65) Prior Publication Data

US 2016/0352875 A1    Dec. 1, 2016

Related U.S. Application Data

(63) Continuation of application No. 14/730,711, filed on Jun. 4, 2015, now Pat. No. 9,293,808.

(30) Foreign Application Priority Data

May 29, 2015    (GB) .................................... 1509317.2

(51) Int. Cl.
*H01Q 1/42* (2006.01)
*H01Q 1/22* (2006.01)
(Continued)

(52) U.S. Cl.
CPC ............ *H04M 1/0202* (2013.01); *H01Q 1/22* (2013.01); *H01Q 1/2258* (2013.01);
(Continued)

(58) Field of Classification Search
CPC .......... H01Q 1/243; H01Q 1/42; H01Q 1/422; H01Q 1/22; H01Q 1/2258; H01Q 1/2266
See application file for complete search history.

(56) References Cited

U.S. PATENT DOCUMENTS

| 2005/0030707 | A1 | 2/2005 | Richardson et al. |
| 2006/0279924 | A1 | 12/2006 | Richardson et al. |

(Continued)

OTHER PUBLICATIONS

Examination Report dated Jul. 13, 2016 in corresponding Application No. GB1509317.2.

(Continued)

*Primary Examiner* — Hoang Nguyen
(74) *Attorney, Agent, or Firm* — Stephen J. Weyer, Esq.; Stites & Harbison, PLLC.

(57) ABSTRACT

A case is provided for a portable Radio Frequency (RF) communications device having an RF antenna. The case includes a base and a plurality of walls, extending from the base. The base and the plurality of walls have requisite dimensions to receive a portable Radio (RF) having an outer surface with a first portion and a second portion. First dielectric characteristics adjacent to the first portion having a relatively low effect on a frequency characteristic of an RF antenna arrangement and second dielectric characteristics adjacent to the second portion having a relatively high effect on the frequency characteristic of the RF antenna arrangement. When the communications device is disposed in the case, the case is adapted to cover part of the first portion of the communications device so as to cause a dielectric parameter adjacent a part of the first portion of the communications device to be relatively high, and a dielectric parameter adjacent the second portion to be relatively low. A method for fitting the case on the RF communications device and method for manufacturing the device is also provided.

27 Claims, 12 Drawing Sheets

(51) Int. Cl.
*H04M 1/02* (2006.01)
*H01Q 1/24* (2006.01)
*H04B 1/3888* (2015.01)

(52) U.S. Cl.
CPC .......... *H01Q 1/2266* (2013.01); *H01Q 1/243* (2013.01); *H01Q 1/42* (2013.01); *H01Q 1/422* (2013.01); *H04B 1/3888* (2013.01)

(56) References Cited

U.S. PATENT DOCUMENTS

| | | | |
|---|---|---|---|
| 2010/0104814 | A1 | 4/2010 | Richardson et al. |
| 2010/0321253 | A1* | 12/2010 | Ayala Vazquez .... H01Q 1/2258 343/702 |
| 2013/0137327 | A1 | 5/2013 | Tseng |
| 2015/0200442 | A1* | 7/2015 | Aurongzeb .......... H01Q 1/2266 343/702 |

OTHER PUBLICATIONS

Examination Report dated Oct. 21, 2016 in corresponding Application No. GB16170092.7.
Search Report, Application No. 1509317.2 dated May 18, 2017, 5 pages.

* cited by examiner

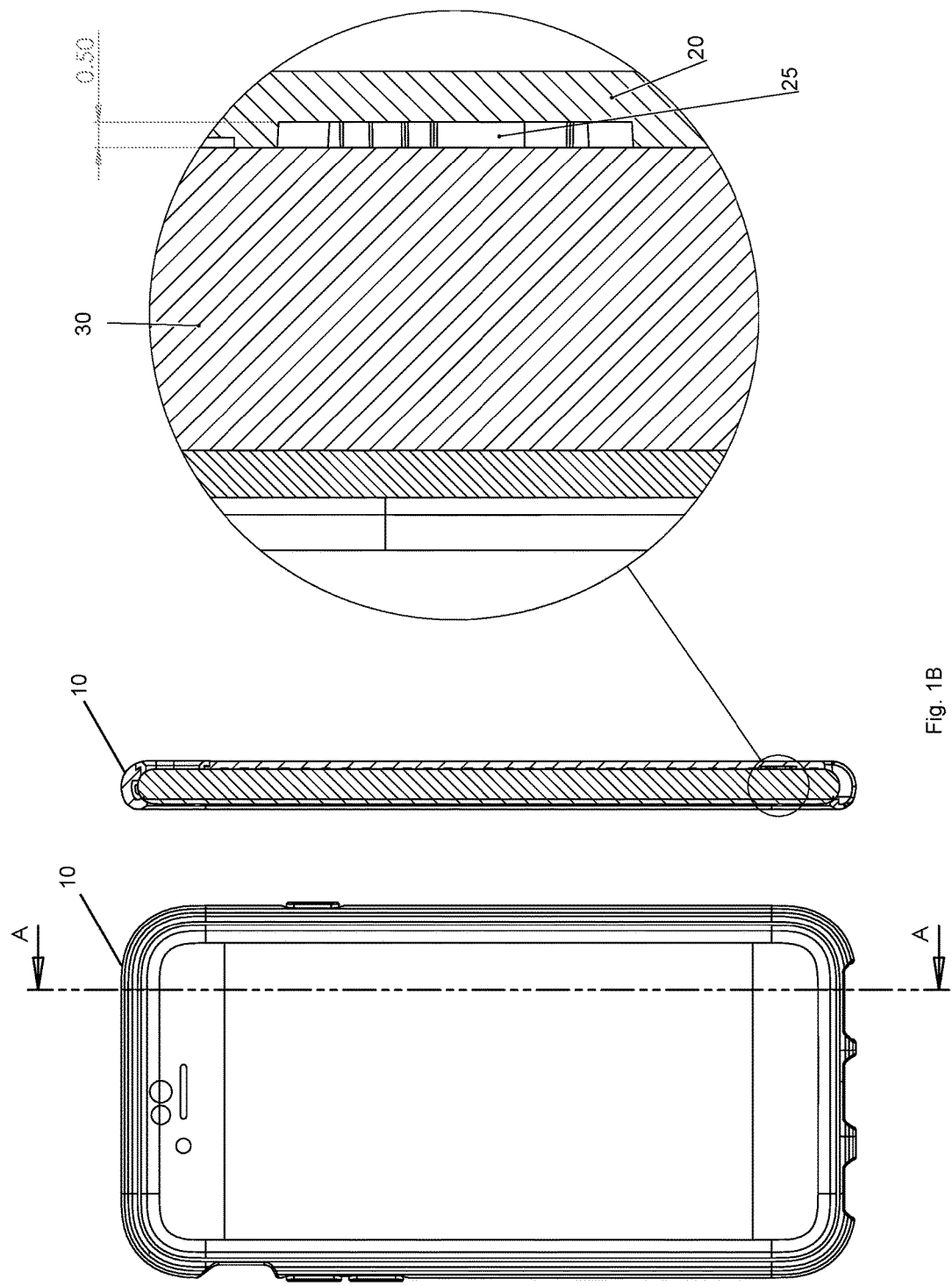

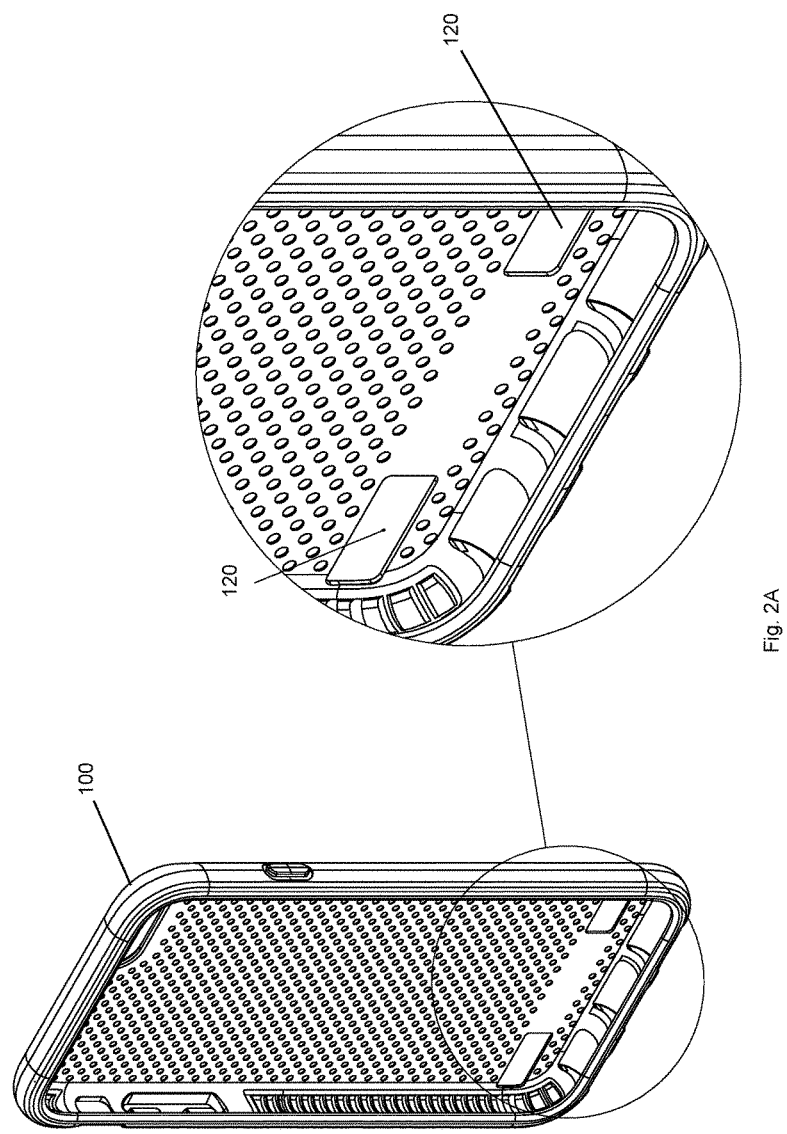

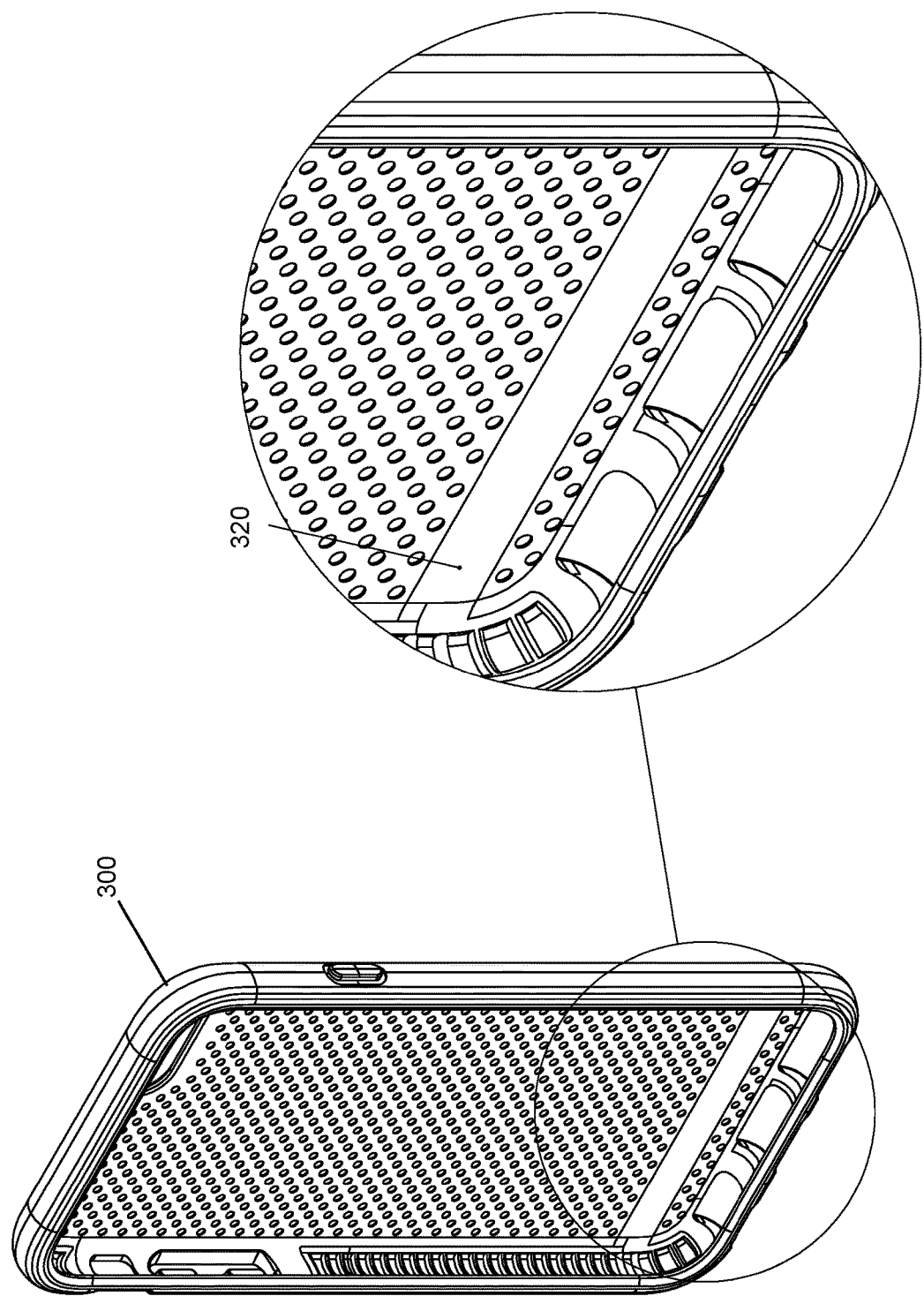

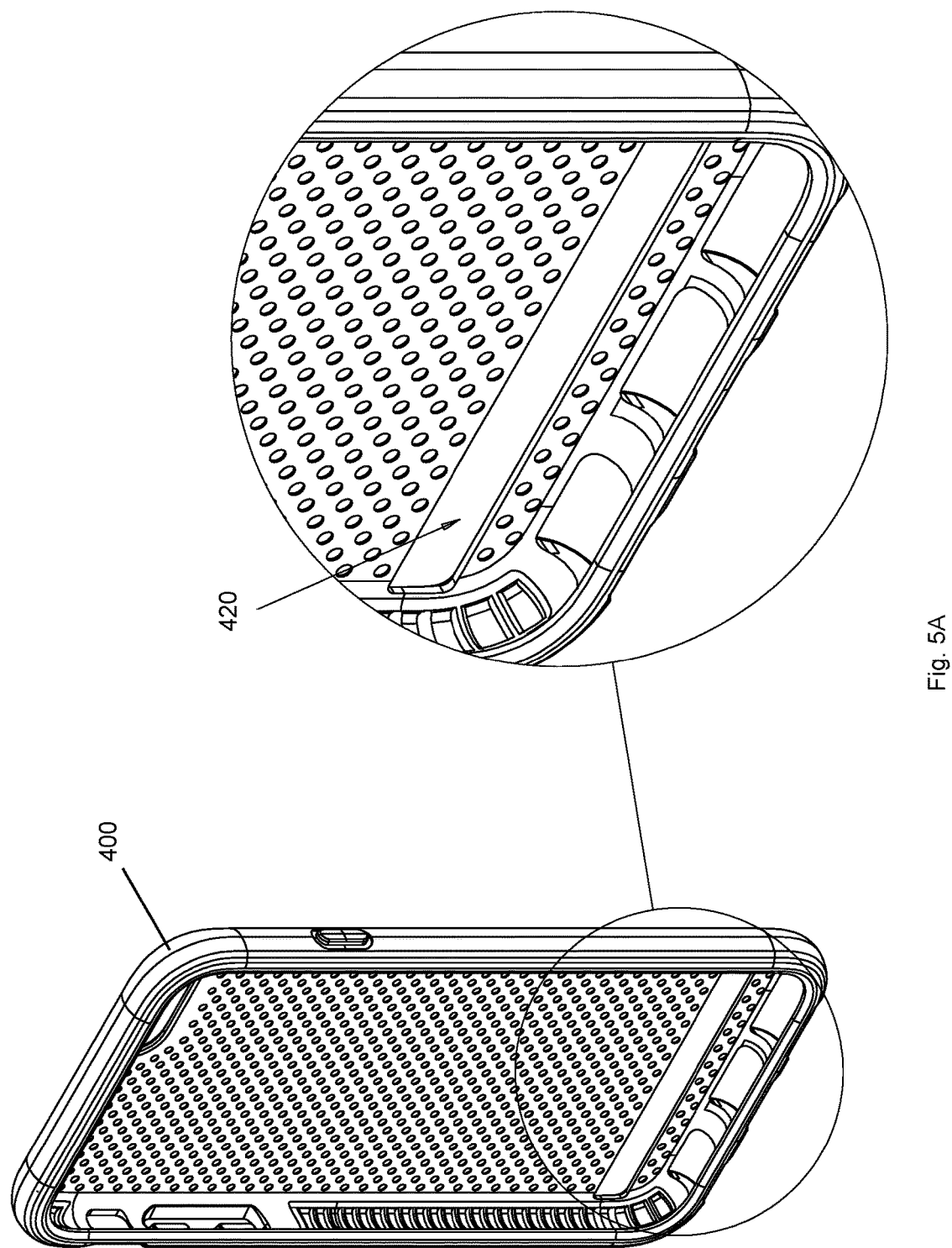

RADIO FREQUENCY PROPERTIES OF A CASE FOR A COMMUNICATIONS DEVICE

CROSS REFERENCE TO RELATED APPLICATION

This application claims the benefit of U.S. patent application Ser. No. 14/730,711, filed Jun. 4, 2015, herein incorporated by reference.

FIELD OF THE INVENTION

The invention relates to a case for a portable Radio Frequency (RF) communications device, a kit comprising such a case, an encased portable RF communications device, a method for encasing a portable RF communications device, a method for designing a case for a portable RF communications device and a method for providing a case for a portable RF communications device.

BACKGROUND TO THE INVENTION

The proliferation of portable (particularly handheld) electronic devices, especially those designed for RF communications such as mobile telephones, smartphones and tablets, has led to increased demand for cases to cover such devices. The case is normally designed to provide protection, particularly against dirt, water and other contaminants. Moreover, improved cases can provide protection to mitigate impact damage to the device, for instance when the device is dropped.

Such portable RF communications devices require an RF antenna arrangement (which may comprise one or multiple antennas). The antenna or antennas may be provided for cellular radio communication, wireless Local Area Network (LAN) communication, short-range networking and in cases, one antenna may be used for multiple types of communication. Early devices provided the RF antenna arrangement external to the device housing, for example as a whip antenna. Cases for such devices would not cover the antenna.

More recent devices have provided the RF antenna arrangement within the device or integrated with the device housing. For example, an RF antenna may be integrated with the device housing by being provided in the form of a conductive strip on an outer side of the housing. Typically, this strip is covered with an insulating material, such as a plastic coating, to mitigate any deterioration in RF antenna performance due to user or atmospheric contact with the antenna. Such antennas allow more interaction between the RF antenna arrangement and an additional case covering the device. Optimizing the interaction between the case and all components of the device, including the RF antenna arrangement, is a challenge for the case designer.

SUMMARY OF THE INVENTION

In accordance with the present disclosure, the invention in varying forms, relates to a case for a portable RF communications device, a kit comprising such a case, an encased portable RF communications device comprising such a case, and a method for encasing a portable RF communications device using such a case. In addition, a method is provided for designing a case for a portable RF communications device and a method for providing a case for a portable RF communications device. Other optional and advantageous alternative features are included in this disclosure.

The present invention, in one form, relates to a for a portable Radio Frequency (RF) communications device having an RF antenna. The case includes a base and a plurality of walls, extending from the base. The base and the plurality of walls have requisite dimensions to receive a portable Radio (RF) having an outer surface with a first portion and a second portion. First dielectric characteristics adjacent to the first portion having a relatively low effect on a frequency characteristic of an RF antenna arrangement and second dielectric characteristics adjacent to the second portion having a relatively high effect on the frequency characteristic of the RF antenna arrangement. When the communications device is disposed in the case, the case is adapted to cover part of the first portion of the communications device so as to cause a dielectric parameter adjacent a part of the first portion of the communications device to be relatively high, and a dielectric parameter adjacent the second portion to be relatively low.

The present invention, in another form thereof relates to an electronic device system which includes a portable RF communications device and a case. The portable communications device has an RF antenna arrangement internal to or integrated with an outer housing. The outer housing has an outer surface which includes a first portion and a second portion. Adjacent to the first portion, first dielectric characteristics has a relatively low effect on a frequency characteristic of the RF antenna arrangement; and adjacent the second portion, second dielectric characteristics has a relatively high effect on the frequency characteristic of the RF antenna arrangement. The case has a base and a plurality of walls. The base is dimensioned to fit a back of the communications device. The plurality of walls extend from the base and are dimensioned to fit corresponding walls of the communications device. When the communications device is disposed in the case, the case is adapted to cover part of the first portion of the communications device so as to cause a dielectric parameter adjacent a part of the first portion of the communications device to be relatively high, and a dielectric parameter adjacent the second portion to be relatively low.

The present invention, in yet another form thereof relates to a case for a portable Radio Frequency (RF) communications device in which the portable RF communications device has an RF antenna arrangement internal to or integrated with an outer housing and the outer housing has an outer surface comprising a first portion, dielectric characteristics adjacent to which having a relatively low effect on a frequency characteristic of the RF antenna arrangement; and a second portion, dielectric characteristics adjacent to which having a relatively high effect on the frequency characteristic of the RF antenna arrangement. The case has a base, dimensioned to fit a back of the RF communications device. The case also has a plurality of walls, extending from the base and dimensioned to fit corresponding walls of the RF communications device. The case is configured to cover part of the first portion so as to cause a dielectric parameter adjacent a part of the first portion to be relatively high, the case being further adapted such that a dielectric parameter adjacent the second portion is caused to be relatively low.

The present invention, in another form thereof relates to a kit which, in one form, includes a portable RF communications device and a case. The portable RF communications device has an RF antenna arrangement internal to or integrated with an outer housing. The outer housing has an outer surface comprising a first portion, dielectric characteristics adjacent to which having a relatively low effect on a frequency characteristic of the RF antenna arrangement; and a second portion, dielectric characteristics adjacent to which having a relatively high effect on the frequency characteristic of the RF antenna arrangement. The case comprises a base, dimensioned to fit a back of the RF communications device; and a plurality of walls, extending from the base and dimensioned to fit corresponding walls of the RF communications device. The case is configured to cover part of the first portion of the communications device so as to cause a dielectric parameter adjacent a part of the first portion to be relatively high, the case being further adapted such that a dielectric parameter adjacent the second portion is caused to be relatively low.

The present invention, in still another form thereof relates to an encased RF communications device, in which the encased RF communications device is encased in a case. The portable RF communications device has an RF antenna arrangement internal to or integrated with an outer housing, the outer housing having an outer surface comprising: a first portion, dielectric characteristics adjacent to which having a relatively low effect on a frequency characteristic of the RF antenna arrangement; and a second portion, dielectric characteristics adjacent to which having a relatively high effect on the frequency characteristic of the RF antenna arrangement. The case comprises a base, dimensioned to fit a back of the RF communications device; and a plurality of walls, extending from the base and dimensioned to fit corresponding walls of the RF communications device. The case is configured to cover part of the first portion of the communications device so as to cause a dielectric parameter adjacent a part of the first portion to be relatively high, the case being further adapted such that a dielectric parameter adjacent the second portion is caused to be relatively low. The case covers the portable RF communications device, such that a dielectric parameter adjacent a part of the first portion covered by the case is relatively high and such that the dielectric parameter adjacent the second portion is relatively low.

The present invention, is yet another form thereof related to a method for encasing a portable RF communications device. The method comprises fitting a case to a portable RF communications device. The case comprises a base, dimensioned to fit a back of a RF communications device; and a plurality of walls, extending from the base and dimensioned to fit corresponding walls of the RF communications device. The portable RF communications device has an RF antenna arrangement internal to or integrated with an outer housing, the outer housing having an outer surface comprising a first portion, dielectric characteristics adjacent to which having a relatively low effect on a frequency characteristic of the RF antenna arrangement; and a second portion, dielectric characteristics adjacent to which having a relatively high effect on the frequency characteristic of the RF antenna arrangement. Fitting the case causes a dielectric parameter adjacent a part of the first portion covered by the case to be relatively high and a dielectric parameter adjacent the second portion to be relatively low.

The present invention, is another form thereof related to a method for manufacturing a case for a portable RF communications device. The portable RF communications device has an RF antenna arrangement internal to or integrated with an outer housing and the case comprising a base, dimensioned to fit a back of the RF communications device; and a plurality of walls, extending from the base and dimensioned to fit corresponding walls of the RF communications device. The manufacturing method comprises identifying on an outer surface of the outer housing: a first portion, dielectric characteristics adjacent to which having a relatively low effect on a frequency characteristic of the RF antenna arrangement; and a second portion, dielectric characteristics adjacent to which having a relatively high effect on the frequency characteristic of the RF antenna arrangement. The manufacturing method further includes providing an adaptation to the case, such that the case is configured to cover part of the first portion so as to cause a dielectric parameter adjacent said part of the first portion to be relatively high and such that a dielectric parameter adjacent the second portion is caused to be relatively low.

In one further form, the manufacturing method further comprises fabricating the case having the adaptation. In still a further manufacturing method, the method includes fitting the case having adaptation to the portable RF communications device.

A case for a portable RF communications device (a mobile telephone, smartphone, tablet, watch or other handheld or wearable device, for instance), in accordance with the disclosure, is provided to mitigate effects on a frequency characteristic of the device's RF antenna arrangement, such as one or more resonant frequencies or a range of frequencies for which the RF antenna arrangement operates with a Standing Wave Ratio (SWR) less than a threshold value. The RF antenna arrangement is internal to or integrated with an outer housing of the device, such as a comprising a conductive strip on the outer housing. The case comprises: a base, dimensioned to fit, e.g. receive, accept, accommodate, or partially cover at least part of the back of the RF communications device (normally the opposite side of the device from that on which a main user interface is provided); and a plurality of walls, extending from the base and dimensioned to fit corresponding walls of the RF communications device. The device's outer housing has an outer surface comprising (and optionally consisting of): a first portion, the dielectric characteristics adjacent to which having a relatively low effect on the frequency characteristic of the RF antenna arrangement; and a second portion, the dielectric characteristics adjacent to which having a relatively high effect on the frequency characteristic of the RF antenna arrangement. The case is configured to cover part of the first portion so as to cause a dielectric parameter adjacent this part of the first portion to be relatively high. Then, the case is further adapted such that the dielectric parameter adjacent the second portion is caused to be relatively low. In this way, the effect of the case on second portion is reduced.

The dielectric characteristics and/or dielectric parameter may be one or both of: permittivity (relative to a vacuum, in this context); and loss tangent. It has especially been found that a providing a material having a permittivity of at least 3 (optionally, greater than 3) and/or a loss tangent of at least 0.05 (optionally, greater than 0.05) adjacent the more sensitive, second portion may have a detrimental effect on the frequency characteristics of the antenna or antennas. Such casing materials, for example a metal-based material; a polycarbonate material, a polyamide material, a thermoplastic polyurethane (TPU) material and/or a Thermoplastic elastomer (TPE) material, are advantageously used as a main component of cases, as they may have advantageous protective, robustness or flexibility properties. A blend of materials may also be used. Thus, the covered part of the first portion may be covered by a higher density of such materials than the second portion. This may be achieved in a variety of ways, for example: reducing the thickness of the case in the second portion; creating an aperture in the case over the second portion; replacing the casing material in the second portion by a secondary material having lower dielectric characteristics; and displacing the casing material (that is, pushing it out) from the housing across the second portion to create a gap, which may be filled by secondary material having lower dielectric characteristics, particularly air or alternatively, a solid material. A combination of approaches may be used across the second portion. In this way, the dielectric parameter may be relatively high adjacent the entire outer surface covered by the case, except for the second portion.

The case may therefore comprise an adaptation so as to cause the dielectric parameter adjacent the second portion to be relatively low, one or more dimensions defining the extent of the adaptation matching corresponding dimensions defining the extent of the second portion. The second portion is preferably defined by the part of the outer surface that would normally be covered by the case, having the greatest effect on the frequency characteristic of the antenna arrangement. This may correspond with a physical extent of the RF antenna arrangement across the device housing. The second portion may be defined by one or more of: a maximum distance from one or more points on the RF antenna arrangement (such as its extremities); and a section of the outer surface to which the RF antenna arrangement is adjacent or on which the RF antenna arrangement is located. The adaptation may only be on the base of the case (corresponding with the back of the device) and/or the second portion.

The case may be provided as part of a kit, also including the RF communications device. Alternatively, the RF communications device may be provided with the case fitted. In another aspect, a method of fitting the case to the RF communications device may also be considered.

In a further aspect, a method for designing a case for a portable RF communications device as discussed herein may be understood. The first and second portions of the device's outer housing outer surface are identified and an adaptation to the case is provided (for instance, as detailed herein), such that the case is configured to cover part of the first portion so as to cause the dielectric parameter adjacent said part of the first portion to be relatively high and such that the dielectric parameter adjacent the second portion is caused to be relatively low. A case in accordance with the design may then be manufactured and optionally fitted to the portable RF communications device.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

BRIEF DESCRIPTION OF THE DRAWINGS

The invention may be put into practice in a number of ways, and preferred embodiments will now be described by way of example only and with reference to the accompanying drawings, in which:

FIG. 1B depicts a back projection and a cross-section view of the case shown in FIG. 1A, a portion of the cross-section view being also magnified;

FIG. 2A shows a perspective view of a case in accordance with a second embodiment, a portion of the case being also shown in a magnified view;

FIG. 4A shows a perspective view of a case in accordance with a fourth embodiment, a portion of the case being also shown in a magnified view;

FIG. 5A shows a perspective view of a case in accordance with a fifth embodiment, a portion of the case being also shown in a magnified view;

DETAILED DESCRIPTION OF A PREFERRED EMBODIMENT

Figure 1A:
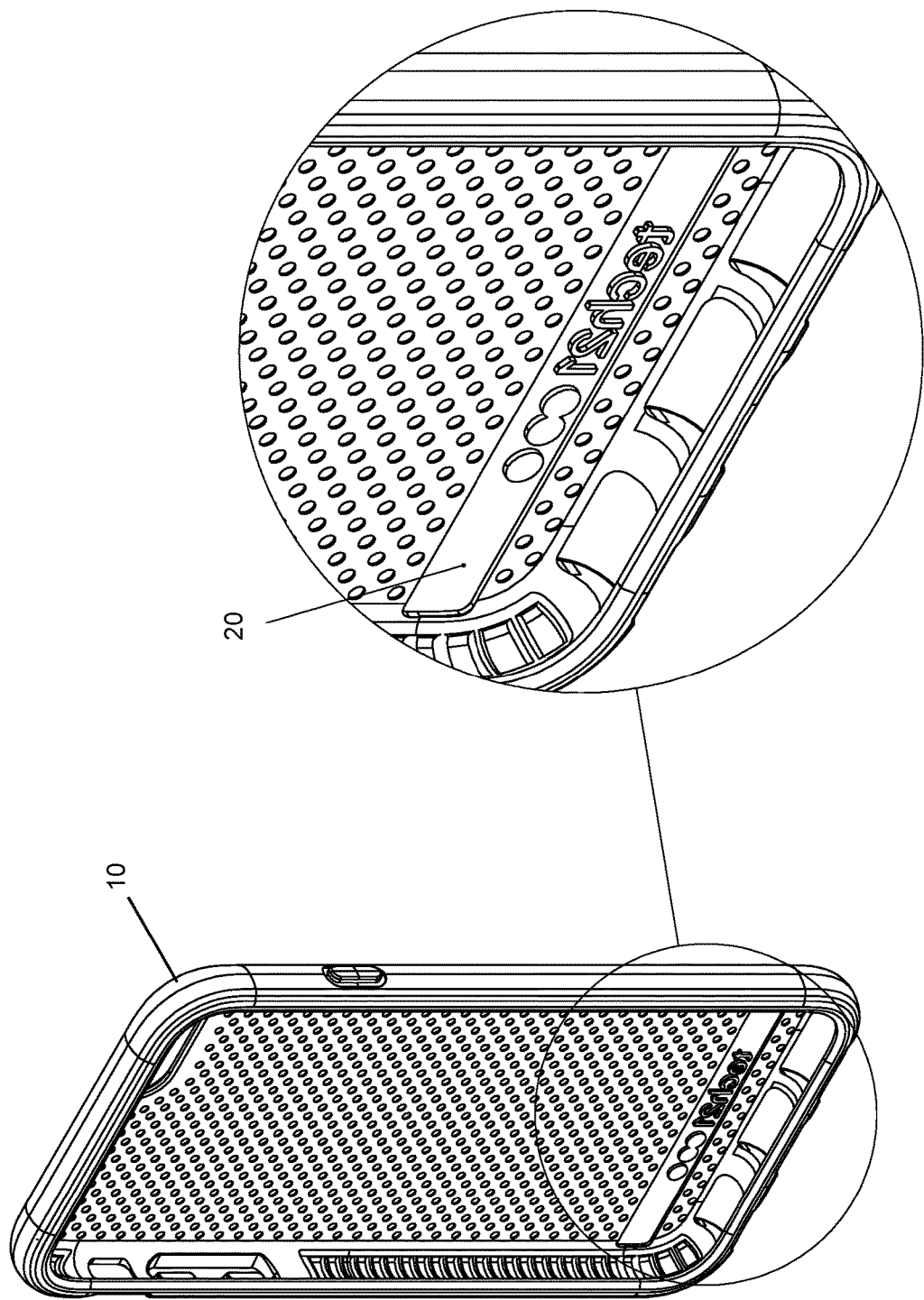
FIG. 1A shows a perspective view of a case in accordance with a first embodiment, a portion of the case being also shown in a magnified view.

Cases are proposed that work in conjunction with the antenna of the mobile device to mitigate, minimize and/or avoid deterioration of the antenna radio frequency. In many portable or handheld RF devices, one or more antennas are configured as dipole antennas (such as a full-wave or half-wave dipole) in which the device Printed Circuit Board (PCB) or a metal housing acts as one element of the dipole. In some cases, the full case can become part of the antenna. The dimension of the case may be in the order of a quarter or a half of a wavelength corresponding with a transmission or reception frequency for the device. The case will therefore have a similar dimension and this can affect the antenna.

In principle, the case can be designed to reduce the dielectric impact of certain materials that may shift and deteriorate the RF characteristics of the antenna (or antennas). In particular, cases that are mainly made out of materials with high dielectric parameters (such as permittivity or dielectric constant and loss tangent) may cause problems. For example, high permittivity may mean increased frequency shift of the RF antenna, due to dielectric loading. A high loss tangent may result in increased energy loss. Absorptions due to stimulation of atoms in the case material may be responsible.

In general terms, this may be understood as a case for a portable RF (electronic) communications device, optionally including the device as well (either as a kit or integrated with the case). A typical communications device may have an interactive area and/or an interactive display, such as a touchscreen. The case preferably comprises: a base, dimensioned to fit a back of the RF communications device; and a plurality of walls, extending from the base and dimensioned to fit corresponding walls of the RF communications device. In this sense, the case may not be considered a bumper for the device, which only fits around the device's sidewalls. Rather, the case covers some (preferably at least 50%, 60%, 70%, 80% or 90%) of the device's back.

The portable RF communications device has an RF antenna arrangement internal to or integrated with an outer housing (which is typically a metal and/or plastic outer body of the device). Thus, the case is not designed for old types of device having a truly external antenna, for example a whip. The outer housing has an outer surface comprising: a first portion, the dielectric characteristics adjacent to which having a relatively low effect on a frequency characteristic of the RF antenna arrangement; and a second portion, the dielectric characteristics adjacent to which having a relatively high effect on the frequency characteristic of the RF antenna arrangement. The case is configured to cover part of the first portion so as to cause a dielectric parameter adjacent said part of the first portion to be relatively high. The case is further adapted such that the dielectric parameter adjacent the second portion is caused to be relatively low.

The dielectric characteristics and/or dielectric parameter preferably comprise one or both of: permittivity; and loss tangent. The case is preferably configured to cause the dielectric parameter adjacent the part of the first portion to be relatively high by covering the part of the first portion with a casing material having the relatively high dielectric parameter. Such casing materials may include one or more of: a metal-based material; a polycarbonate material; a polyamide material; a Thermoplastic polyurethane (TPU) material; and a Thermoplastic elastomer (TPE) material. It has particularly been found that, in the area of the RF antenna, a case with a material that for instance has a permittivity of 3 or more and/or a loss tangent of 0.05 or greater can cause detrimental effects. It is therefore preferred for best frequency performance to have a material with a low dielectric constant in the area of the RF antenna (the second portion in the terms defined above), most preferably, a permittivity less than (or less than or equal to) 3, although less than or less than or equal to 4, 3.75, 3.5, 3.25, 3.2, 3.1, 2.9, 2.8, 2.7, 2.6 and 2.5 are considered. The permittivity threshold may depend on the antenna design and/or configuration. Additionally or alternatively, the material for best frequency performance should most preferably have a loss tangent less than (or less than or equal to) 0.05, although less than or less than or equal to 0.06, 0.04, 0.03 and 0.025 are also considered. A material that may be suitable in this context is PTFE. However, air could also be better than some of the materials that are used for casing. Relative permittivity and loss tangent values for some specific materials, as measured at 500 MHz, are given below. Some of these materials are specific blends, given by way of example only.

| Material | Permittivity | Loss Tangent |
|---|---|---|
| Blend of TPU materials | 2.9 | 0.015 |
| General TPU 1 | 3.6 | 0.062 |
| General TPU 2 | 3.6 | 0.066 |
| Polyamides PA | 3.5 | 0.012 |
| Blend of TPE materials | 2.1 | 0.0008 |

Generally speaking, the case may be adapted or configured to cause the dielectric parameter adjacent the second portion to be relatively low by covering all or part of the second portion with the casing material, covering all or part of the second portion with a secondary material that is different to the casing material (with or without the casing material also covering the second portion) or not covering all or part of the second portion at all. Where the second portion is covered with the casing material, a configuration of the casing material covering the second portion may be adapted such that the dielectric parameter adjacent the second portion is relatively low.

The RF communications device typically has an elongate structure, generally with two relatively large surfaces that usually define the front and back of the device. The front is usually provided with the main user interface and/or main screen of the device and the back is normally the opposite surface to the front. Further user interface features may be provided on the side of the device, such as power, volume and input/output controls. Input/output ports may also be provided on one or more of the sidewalls of the device. A camera may be provided on the front and/or the back of the device.

A number of different implementations will be described below, each having a single adaptation to improve the characteristics of the antenna, when used in combination with the case. Nevertheless, it will be recognised that these implementations may be combined and more than one adaptation may be provided in the same case.

Referring first to FIG. 1A, there is shown a perspective view of a case 10 in accordance with a first embodiment. A portion of the case is also shown in a magnified view (at a scale of 2:1). As can be seen, a recessed channel 20 is provided in the case, in the area of the mobile device antenna.

Referring next to FIG. 1B, there is depicted a back projection and a cross-section view (along the line A-A) of the case 10 shown in FIG. 1A. A portion of the cross-section view is also magnified on an approximate scale of 10:1. In this magnified view, the recessed channel 20 can be seen and this provides an air gap 25 between the recessed channel 20 and the mobile device 30, positioned in the case. By providing an air gap 25 in this localized area of the recessed channel 20, contact of materials, especially those with high dielectric characteristics, with the mobile device (particularly the area around the RF antenna or antennas) is removed. As shown in FIG. 1B, the recessed channel 20 may provide an air gap (cavity) that is at least 0.25 mm of the device surface and as shown, is 0.5 mm, but may be greater, for example 0.75 mm or 1 mm. In principle, the air gap 25 should be no greater and preferably less than the total thickness of the casing material. The thickness of the case in the recessed channel 20 is typically the same as thickness in the remainder of the case 10.

In general terms, this may be understood as the case being configured to cause the dielectric parameter adjacent the second portion to be relatively low by means of a displacement of the casing material away from the second portion. The displacement provides a gap between the casing material and the second portion. Then, the gap is filled by a secondary material having the relatively low dielectric parameter, which in this case is air. The relative permittivity of air is typically approximately (or fractionally above) 1. The displacement is typically at least and/or at most 0.25 mm, but it may be at least and/or at most 0.1 mm, 0.2 mm, 0.3 mm, 0.4 mm, 0.5 mm, 0.6 mm, 0.7 mm, 0.8 mm, 0.9 mm or 1 mm (a combination of upper and lower limits being possible based on any two of these values). Additionally or alternatively, the displacement may be no greater than a thickness of the casing material (where it covers the first portion and/or where it covers the second portion). It will be understood that, in some embodiments, the adaptation may not be a displacement of the casing material away from the second portion, such as a recessed channel 20.

Figure 2B:
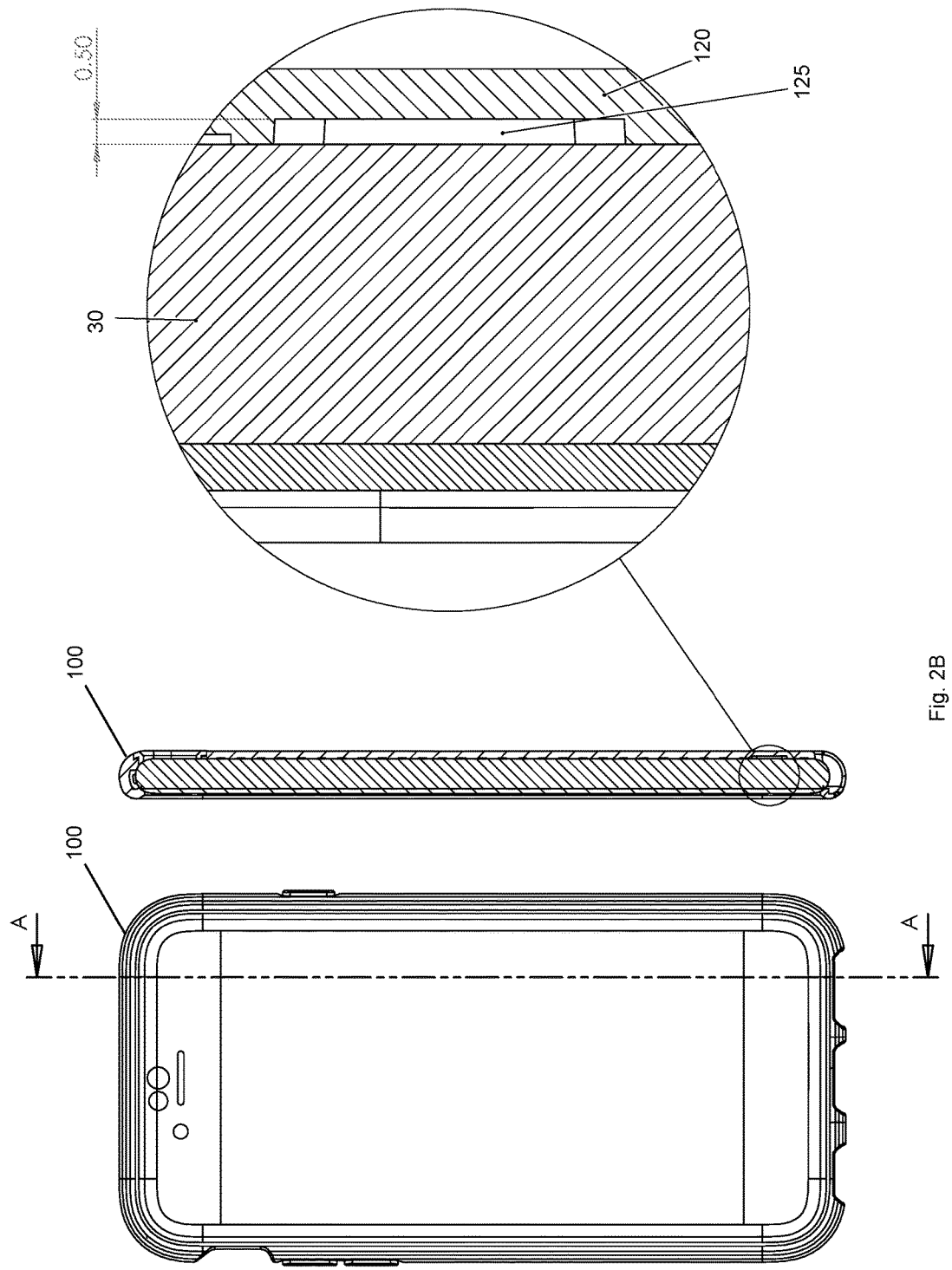
FIG. 2B depicts a back projection and a cross-section view of the case shown in FIG. 2A, a portion of the cross-section view being also magnified.

Referring next to FIG. 2A, there is shown a perspective of a case 100, in accordance with a second embodiment. A portion of the case is also shown in a magnified view (with a scale of 2:1). Here, recessed channels 120 can be seen. Referring next to FIG. 2B, there is depicted a back projection and a cross-section view (along the line A-A) of the case 100, as shown in FIG. 2A. A portion of the cross-section view is also magnified. Here, it can be seen that the recessed channels 120 are formed in the same way as shown with reference to FIGS. 1A and 1B. An air gap 125 is therefore defined, corresponding with each of the recessed channels 120 respectively. Here, the air gaps 125 are only provided in certain areas adjacent the RF antenna arrangement. These areas (which may be termed "hotspots") may be the extremities of the antenna or may correspond with a main lobe (or main beam) and/or one or more side lobes of the antenna's (far field) radiation pattern. In particular, they may be the areas that have the greatest effect on the antenna RF characteristics.

Generally, it may be understood that the second portion may comprise one or more contiguous areas of the outer surface. For example, each of the one or more contiguous areas of the outer surface may correspond with a respective one or more extremity of an RF antenna of the RF antenna arrangement.

Figure 3A:
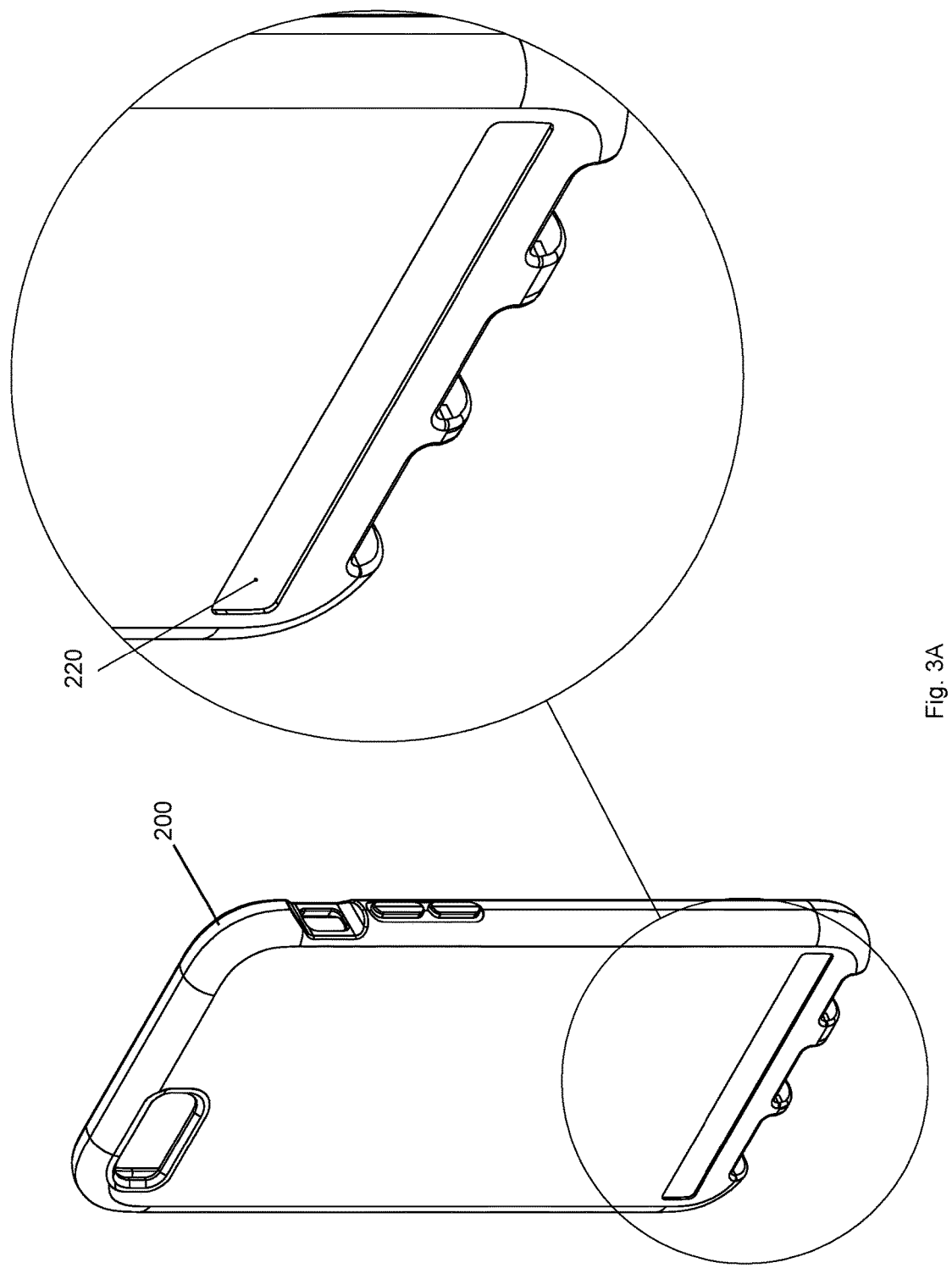
FIG. 3A shows a perspective view of a case in accordance with a third embodiment, a portion of the case being also shown in a magnified view.

Referring next to FIG. 3A, there is shown a perspective view of a case 200 in accordance with a third embodiment. A portion of the case is also shown in a magnified view (on a scale of 2:1). Here, a recess 220 can be seen. Recess 220 is formed by removing material from the outer surface of the case 200, only in the area corresponding to the device antenna.

Figure 3B:
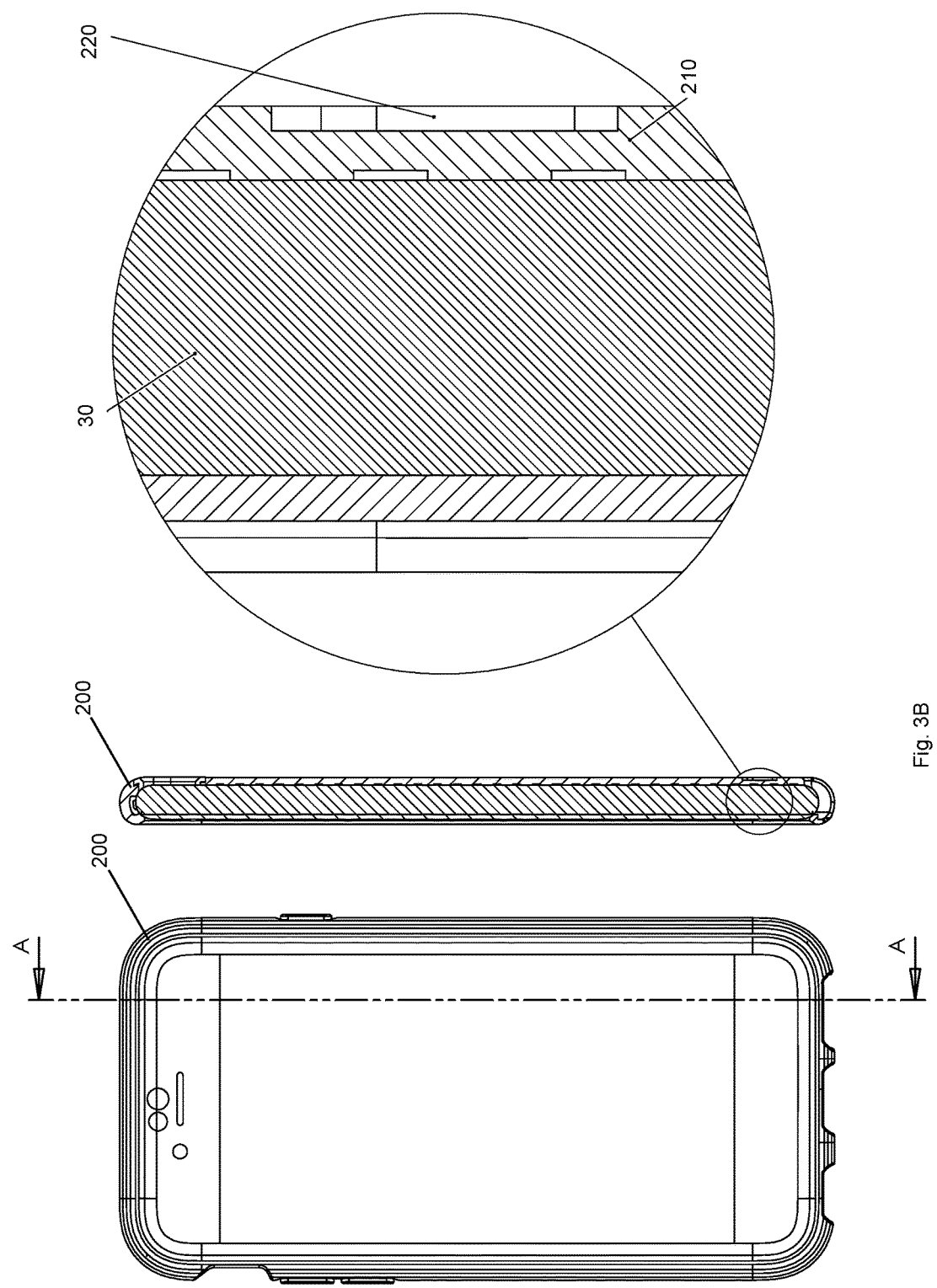
FIG. 3B depicts a back projection and a cross-section view of the case shown in FIG. 3A, a portion of the cross-section view being also magnified.

Referring next to FIG. 3B, there is depicted a back projection and a cross-section view (along the line A-A) of the case 200, as shown in FIG. 2A. A portion of the cross-section view is also shown in magnified form. Here, the recess 220 (which may also be considered an outer surface channel) of the case 200 can be seen and the casing material where thinned 210 is also visible, against the mobile device 30. Effectively, this reverses the material removal of the first and second embodiments, as shown in the previous drawings. The reduction of the material in the area of the antenna causes a reduced effect on the frequency characteristics of the antenna. The material thickness may be reduced by at least 25%. Optionally, it may be reduced by more than 25%, such as 30%, 40% or 50%. Although FIGS. 3A and 3B show the recess extending along the whole width of the device, a plurality of recesses may be provided instead at particular areas corresponding with "hotspots" of the RF antenna arrangement, in a similar manner to that shown with reference to FIGS. 2A and 2B.

Generally speaking, the casing material covering the part of the first portion has a first thickness. Then, the casing material covering the second portion may have a second, smaller thickness, such that the dielectric parameter adjacent the second portion is relatively low. Preferably, the second thickness is no more than or no greater than 75% of the first thickness, but it may be no more or no greater than 95%, 90%, 80%, 70%, 60%, 50%, 40%, 30%, 25% and 20% of the first thickness. The second thickness may be at least 0.5 mm, for example. It will be understood that, in some embodiments, the adaptation may not be a second, smaller thickness of the casing material covering the second portion, such as thinned casing material 210 or recess 220.

Referring next to FIG. 4A, there is shown a perspective view of a case 300 in accordance with a fourth embodiment. The case 300 includes a secondary material with lower dielectric parameters than the primary material used to make the case 300. A portion of the case is also shown in a magnified view (at a scale of 2:1). Here, the area where the secondary material is located 320 can be seen. This is in the form of a filled channel, as will now be explained.

Figure 4B:
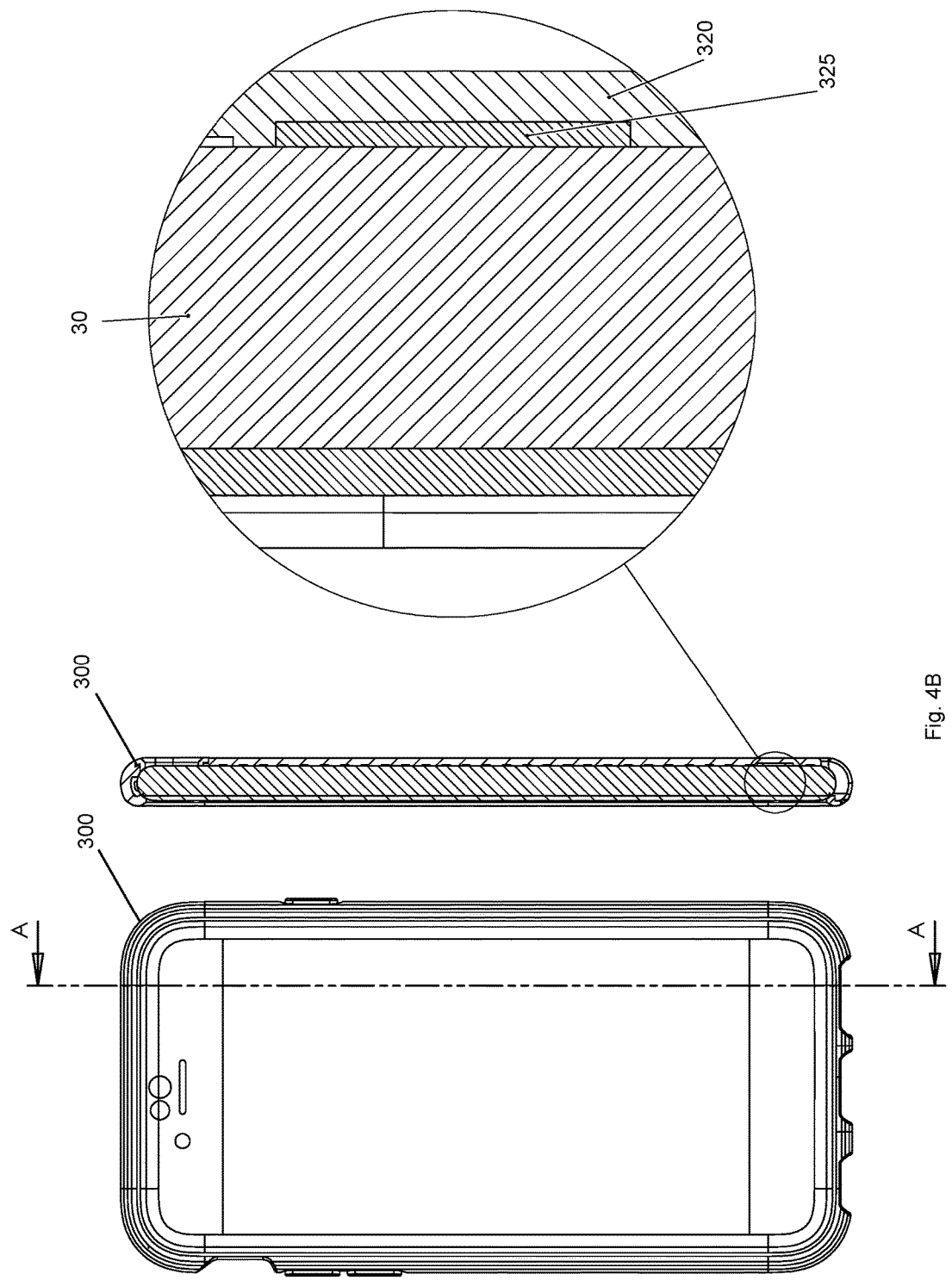
FIG. 4B depicts a back projection and a cross-section view of the case shown in FIG. 4A, a portion of the cross-section view being also magnified.

Referring next to FIG. 4B, there is depicted a back projection and a cross-section view (along the line A-A) of the case 300, as shown in FIG. 4A. A portion of the case 300 is also shown in a magnified view (at a scale of 10:1). Here, it can be seen that in a recessed portion of the case 320, a secondary material 325 is inserted. This secondary material 325 has a low dielectric characteristic. For example, a permittivity of less than 3 and/or a loss tangent of less than 0.05 is preferred. Again, the filled channel 320 with secondary material 325 need not be provided across the full width of the case 300. Rather, it can be provided in certain portions of the case 300, in line with the designs shown in FIGS. 2A and 2B.

In general terms, the case may be configured to cause the dielectric parameter adjacent the second portion to be relatively low by means of a displacement of the casing material away from the second portion. The displacement provides a gap between the casing material and the second portion and the gap may be filled by a secondary material having the relatively low dielectric parameter. In this case, the secondary material is not air, but may comprise a solid and/or a gel material. Possible materials may include one or more of: Polytetrafluoroethylene (PTFE); and a TPU material. Possible permittivity and/or loss tangent parameters for the secondary material are identified above.

Referring next to FIG. 5A, there is shown a perspective view of a case 400, in accordance with a fifth embodiment. A portion of the case 400 is also shown in a magnified view (at a scale of 2:1). Here, an aperture 420 can be seen in the case. Aperture 420 is created by cutting a hole through the case in the area of the antenna.

Figure 5B:
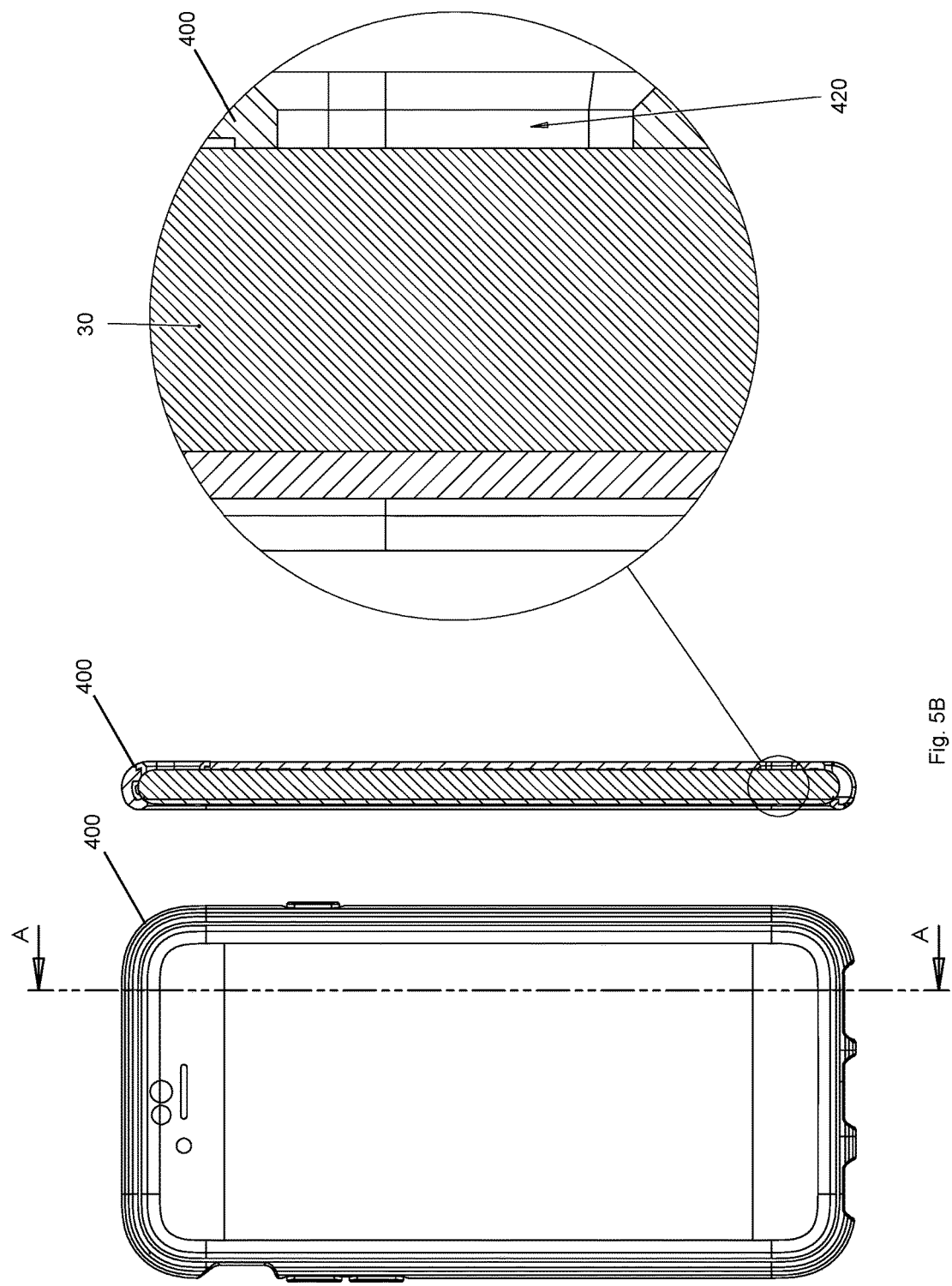
FIG. 5B depicts a back projection and a cross-section view of the case shown in FIG. 5A, a portion of the cross-section view being also magnified.

Referring to FIG. 5B, there is depicted a back projection and a cross-section view (along the line A-A) of the case 400, as shown in FIG. 5A. A portion of the cross-section view is also magnified (at a scale of 10:1). Here, the hole or cut-out forming aperture 420 can be seen. Like the previously described designs, the aperture 420 need not be provided across the whole width of the case 400. Instead, it may be provided only in localised portions along the width, in the manner shown in FIGS. 2A and 2B, for example.

In general terms, the case may be configured to cause the dielectric parameter adjacent the second portion to be relatively low by providing an aperture (a hole or cut-out) in the casing material adjacent the second portion. The aperture causes the second portion to be exposed to atmosphere (that is, air) and the atmosphere has the relatively low dielectric parameter.

It will be understood that, in some embodiments, the adaptation may not comprise or be an aperture (or comprise only one aperture) in the casing material adjacent the second portion, such as only aperture 420 or only multiple apertures in localised portions along the width. Adaptations not based on an aperture may have some specific advantages. For example, the use of a cavity or recess may provide a larger area of non-contact between the device outer housing and the user, thereby improving RF performance. Additionally or alternatively, cases in which the casing material extends over the second portion may be structural stronger than those with an aperture. Cases in which the casing material extends over the second portion may provide protection against scratching or other damage that may be direct or indirect.

Considering all of the embodiments described above, a few further general observations may be made. For instance, it may be seen that at least part of the case's base is typically adapted to cause the dielectric parameter adjacent the second portion to be relatively low. Additionally or alternatively, it may be understood that the second portion has an extent that is limited to the back of the RF communications device. However, it may be the case that at least part of the case's walls are adapted to cause the dielectric parameter adjacent the second portion to be relatively low (in addition or alternative to the back). In some cases, the second portion has an extent that is limited to the sidewalls of the RF communications device. In the currently preferred embodiment, the second portion has an extent that is limited to a bottom half and more preferably the bottom quarter of the back of the RF communications device.

Optionally, the second portion comprises one or more contiguous areas of the outer surface. In embodiments, the second portion multiple, separate areas of the outer surface. For example, each of the one or more contiguous areas of the outer surface may correspond with a respective one or more extremity of an RF antenna of the RF antenna arrangement. In another sense, it may be considered that each of the one or more contiguous areas corresponds with a part of an RF antenna of the RF antenna arrangement having a relative maximum in a radiation pattern of the RF antenna. This maximum may be relative to areas immediately around it (a "lobe" of the radiation pattern) or a maximum relative to the whole radiation pattern of the antenna (a "main lobe"). The second portion may be defined by a maximum distance and/or (at least) a minimum distance from one or more points on the RF antenna arrangement, for example 0.25 mm, 0.5 mm, 1 mm, 1.5 mm, 2 mm, 2.5 mm, 3 mm, 3.5 mm, 4 mm, 4.5 mm, 5 mm, 6 mm, 7 mm, 8 mm, 9 mm or 10 mm. In some embodiments, it may be considered that the second portion is defined by a section of the outer surface to which the RF antenna arrangement is adjacent or on which the RF antenna arrangement is located. For example, the second portion may be defined by at least a minimum distance from a transmittance perimeter of one, some or each RF antenna of the RF antenna arrangement. The minimum distance may be any of those listed above, but preferably 0.5 mm. Additionally or alternatively, the second portion may have an area that is at least and/or no more than 50% (or optionally 40%, 30%, 25%, 20%, 15%, 10% or 5%) of the area of the back of the RF communications device (a combination of upper and lower limits being possible based on any two of these values). The base may be elongate (and possibly generally rectangular in shape), typically corresponding with the back of the RF communications device. The base may therefore have a width (and a length). In some embodiments, the adaptation and/or second portion extends across at least and/or no more than around 15% of the width and optionally around 20%, 25%, 30%, 35%, 50%, 75%, 80%, 90%, 95% or 100% of the width (a combination of upper and lower limits being possible based on any two of these values). Optionally, the adaptation and/or second portion extends continuously across the width.

It may be that the second portion of the outer surface is the only part of the outer surface within the overall extent of the case that has a relatively low dielectric parameter. In other words, the case may be configured such that the dielectric parameter adjacent the entire outer surface covered by the case is relatively high, except for the second portion. The second portion typically includes the part of the outer surface having the highest effect on the frequency characteristics of the RF antenna arrangement. The extent of the adaptation made to the case to reduce the dielectric characteristic in the second portion may be limited to that area. To state this in a different way, the case may comprise an adaptation so as to cause the dielectric parameter adjacent the second portion to be relatively low, one or more dimensions defining the extent of the adaptation matching corresponding dimensions defining the extent of the second portion. The case may be configured so that adjacent to the second portion, the low dielectric material or materials extend from the outer housing to an outer surface of the case.

The frequency characteristic of the RF antenna arrangement may comprise one or more of: one or more resonant frequencies of the RF antenna arrangement; a range of frequencies for which the RF antenna arrangement operates with a SWR less than a threshold value (no higher than 1.1:1, 1.15:1, 1.2:1, 1.25:1, 1.5:1, 1.75:1, 2:1, 2.5:1 or 3:1, for example). The frequency characteristic of the RF antenna arrangement may relate to a characteristic of the RF antenna arrangement at a frequency in one or more of: a GSM frequency band; a Universal Mobile Telecommunications System (UMTS) frequency band; a Long Term Evolution (LTE) frequency band; and a wireless local area network, LAN, frequency band. For instance, coverage of one or more of the following frequency bands may be of interest: UMTS 1, UMTS 2, UMTS 4, UMTS 5, UMTS 8, WFi 2.4, WFi 5, LTE 3, LTE 7, LTE 8, LTE 13, LTE 17, LTE 28 and LTE 40. LTE transmit bands B1, B5, B7, B8, B40 and/or B58 may be of interest. LTE receive bands B1, B2, B5, B8, B17 and/or B40 may also be of interest.

The embodiment shown in FIGS. 4A and 4B uses a secondary material in addition to a casing material. It will be appreciated that the secondary material may replace the casing material across all or part of the second portion. The casing material then need not cover the second portion at all. Such an embodiment is now described with reference to FIG. 6A, in which there is shown a perspective view of a case 500, in accordance with a sixth embodiment. A portion of the case 500 is also shown in a magnified view (at a scale of 2:1). Here, a full cut-through channel is provided in the case 500 and a secondary material 520 is provided in the channel, integrated with the case 500. This can be seen in this drawing.

Figure 6A:
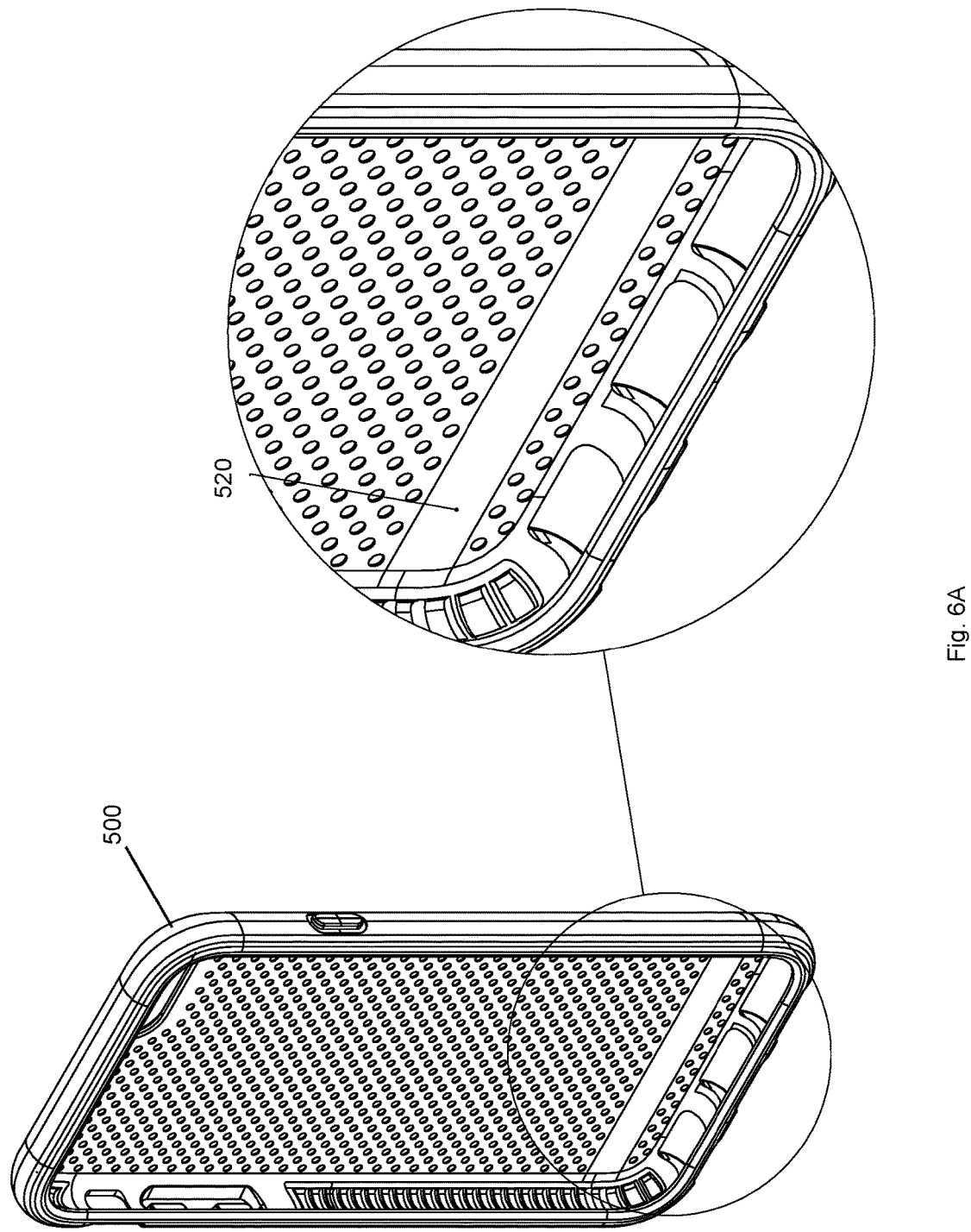
FIG. 6A shows a perspective view of a case in accordance with a sixth embodiment, a portion of the case being also shown in a magnified view.
Figure 6B:
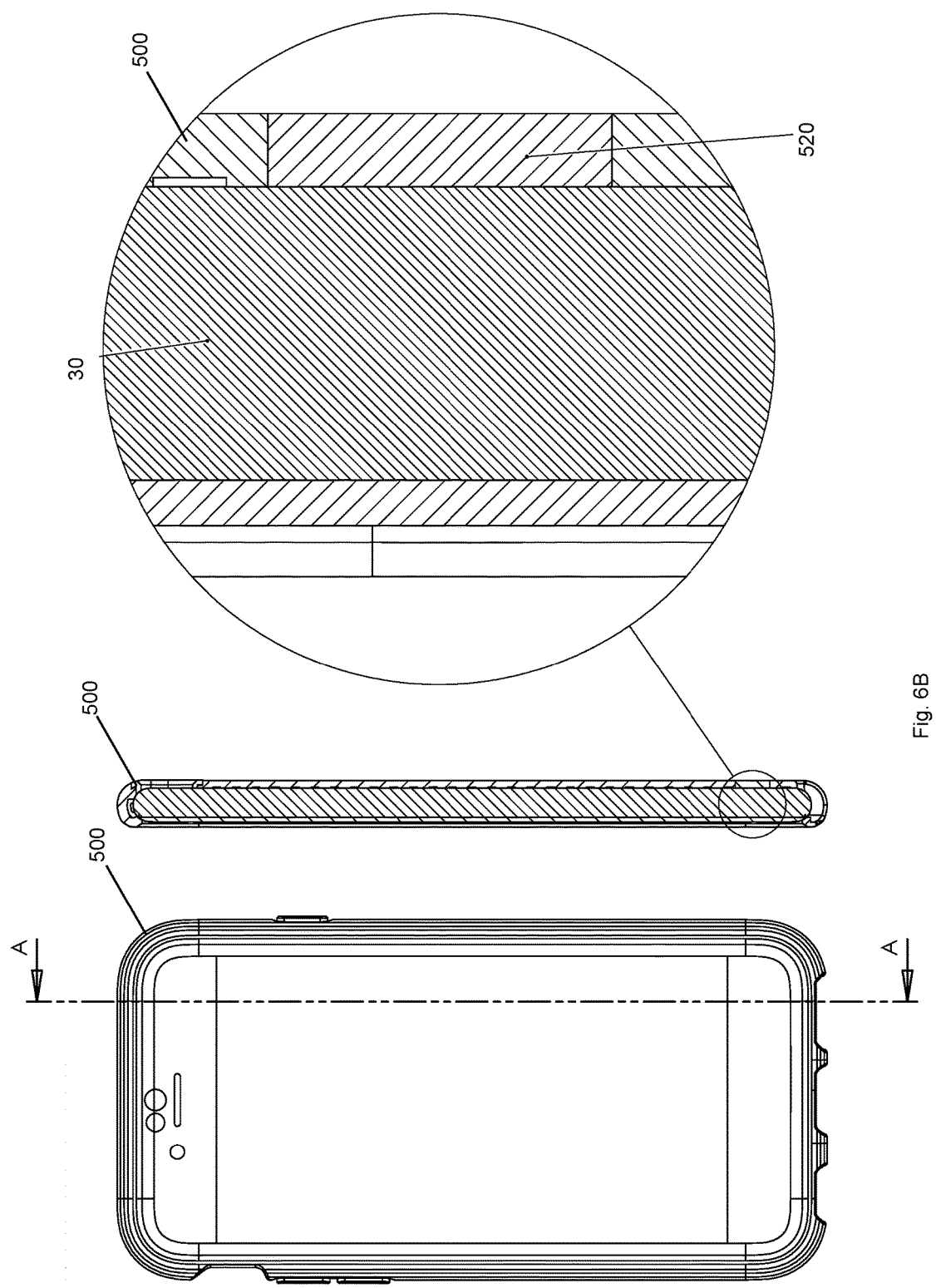
FIG. 6B depicts a back projection and a cross-section view of the case shown in FIG. 6A, a portion of the cross-section view being also magnified.

Referring to FIG. 6B, there is depicted a back projection and a cross-section view (along the line A-A) of the case 500, as shown in FIG. 6A. A portion of the cross-section view is also magnified (at a scale of 10:1). Here, the secondary material provided in the channel 520 can be seen. The size, shape and other configuration of the channel is similar (or the same) as those discussed previously, especially with reference to the embodiments shown in FIGS. 1A, 1B, 3A, 3B, 4A, 4B, 5A and 4A. The secondary material 520 can be the same or similar to those discussed above, for example with reference to FIGS. 4A and 4B. Like the previously described designs, the secondary material in a channel 520 need not be provided across the whole width of the case 500. Instead, secondary material may be provided only in localised portions along the width (in a partial cut-through channel), in the manner shown in FIGS. 2A and 2B, for example.

Although preferred embodiments have been described above, the skilled person will appreciate that modification and variations are possible, some of which have been noted above. The materials and exact configuration of the adaptation or adaptations in the case can be varied. For example, the shape of the adaptation (recess, hole, cut-out or thinned portion, for instance) can be set, in view of technical and/or non-technical considerations.

The case can be provided together with the device as a combination, for instance in the form of a kit or as a ready-assembled encased device. In either sense, the case may be dimensioned to fit the portable RF communications device. Additionally or alternatively, the case may be designed to or actually cover the portable RF communications device, such that the dielectric parameter adjacent a part of the first portion covered by the case is relatively high and such that the dielectric parameter adjacent the second portion is relatively low. Any of the features defined herein with respect to the case may equally apply to the combination of the case and device.

A method for encasing a portable RF communications device may also be considered, comprising fitting any case as defined herein to such a portable RF communications device. Fitting the case causes the dielectric parameter adjacent a part of the first portion covered by the case to be relatively high and the dielectric parameter adjacent the second portion to be relatively low.

The skilled person may also consider a method for designing a case for a portable RF communications device, as described herein. For instance, the portable RF communications device has an RF antenna arrangement internal to or integrated with an outer housing. The case comprises: a base, dimensioned to fit a back of the RF communications device; and a plurality of walls, extending from the base and dimensioned to fit corresponding walls of the RF communications device. The method comprises: identifying on an outer surface of the outer housing: a first portion, the dielectric characteristics adjacent to which having a relatively low effect on a frequency characteristic of the RF antenna arrangement; and a second portion, the dielectric characteristics adjacent to which having a relatively high effect on the frequency characteristic of the RF antenna arrangement; and providing an adaptation to the case, such that the case is configured to cover part of the first portion so as to cause a dielectric parameter adjacent said part of the first portion to be relatively high and such that the dielectric parameter adjacent the second portion is caused to be relatively low. Optionally, a method of providing a case for a portable RF communications device comprises: designing a case in accordance with this method of designing, to provide a case design; and manufacturing a case in accordance with the case design. The method may further comprise fitting the case to the portable RF communications device. Any of these methods may additionally include optional features of designing in accordance with any of the structural features of the case disclosed herein.

The invention claimed is:

1. A case for a portable Radio Frequency (RF) communications device having a housing enclosing an RF antenna or a housing integral with an RF antenna, the case comprising:
 a base; and
 a plurality of walls, extending from the base;
 the base and the plurality of walls having requisite dimensions to removably receive a separate portable Radio Frequency (RF) communications device having a housing enclosing an RF or the housing integrated with an RF antenna, and the housing having an outer surface with a first portion and a second portion, a first dielectric characteristics adjacent to the first portion having a relatively low effect on a frequency characteristic of an RF antenna arrangement; and a second dielectric characteristics adjacent to the second portion having a relatively high effect on the frequency characteristic of the RF antenna arrangement,
 wherein, when the communications device is disposed in the case, the case is adapted to cover part of the first portion of the communications device so as to cause:
  i. a dielectric parameter adjacent a part of the first portion of the communications device to be relatively high, and
  ii. a dielectric parameter adjacent the second portion to be relatively low, and
 wherein at least a part of the base to be adjacent the first portion of the communications device when the communications is disposed in the case, includes a casing material having a relatively high dielectric parameter, which thereby causes the dielectric parameter adjacent the first portion of the communications device to be relatively high, when the communications device is disposed in the case, wherein the casing material comprises a material with a permittivity of at least 3 and/or a loss tangent of greater than 0.05.

2. The case of claim 1, wherein the dielectric characteristics and/or dielectric parameter comprises one or both of permittivity and loss tangent.

3. The case of claim 1, wherein the casing material is composed of one or more of the materials selected from the group consisting of a polycarbonate material; a polyamide material; a Thermoplastic polyurethane (TPU) material; and a Thermoplastic elastomer (TPE) material.

4. The case of claim 1, wherein the base and/or plurality of walls have an aperture, the aperture located proximate the second portion of the communications device when the communications device is disposed in the case, whereby, the aperture causes the second portion to be exposed to atmosphere having a relatively low dielectric parameter, to thereby produce the relatively low dielectric parameter adjacent the second portion of the communications device, when the communications device is disposed in the case.

5. The case of claim 1, wherein the base and/or plurality of walls includes a part comprising a secondary material, the secondary material being different from the casing material and the secondary material having a relatively low dielectric parameter, the part comprising the secondary material being adjacent the second portion of the communications device, when the communications device is disposed in the case, to thereby produce the relatively low dielectric parameter adjacent the second portion of the communications device, when the communications device is disposed in the case.

6. The case of claim 5, wherein the secondary material has a permittivity less than 3 and/or a loss tangent of no greater than 0.05.

7. The case of claim 5, wherein the secondary material is air.

8. The case of claim 5, wherein the secondary material comprises one or more of materials selected from the group consisting of Polytetrafluoroethylene (PTFE); a TPU material; a blend of TPU materials; a TPE material; a blend of TPE materials; a polycarbonate material; and a polyamide material.

9. The case of claim 5, wherein the secondary material has a permittivity of no greater than 3 and/or a loss tangent of no greater than 0.05.

10. The case of claim 1, wherein the base and/or plurality of walls includes the casing material adapted to be adjacent the second portion of the communications device when the communications device is disposed in the case, wherein the casing material covers the second portion of the communications device when the communications device is disposed in the case, to thereby produce the relatively low dielectric parameter adjacent the second portion of the communications device, when the communications device is disposed in the case.

11. The case of claim 10, wherein the base and/or plurality of walls to be adjacent the secondary portion of the communications device when disposed in the case, are adapted to be spaced from the secondary portion via a gap between the casing material and the second portion.

12. The case of claim 1, wherein at least part of the base is adapted to cause the dielectric parameter adjacent the second portion of the communications device to be relatively low when the communications device is disposed in the case.

13. The case of claim 12, wherein second portion has an extent that is limited to the back of the communications device.

14. The case of claim 13, wherein the second portion has an extent that is limited to a bottom quarter of the back of the communications device.

15. The case of claim 1, wherein the second portion comprises one or more contiguous areas of the outer surface.

16. The case of claim 15, wherein each of the one or more contiguous areas of the outer surface corresponds with a respective one or more extremity of an RF antenna of the RF antenna arrangement.

17. The case of claim 15, wherein each of the one or more contiguous areas of the outer surface corresponds with a part of an RF antenna of the RF antenna arrangement having a relative maximum in a radiation pattern of the RF antenna.

18. The case of claim 1, wherein the second portion is defined by a maximum distance from one or more points on the RF antenna arrangement.

19. The case of claim 1, wherein the second portion is defined by at least a minimum distance from a transmittance perimeter of each RF antenna of the RF antenna arrangement.

20. The case of claim 1, wherein the second portion is defined by a section of the outer surface to which the RF antenna arrangement is adjacent or on which the RF antenna arrangement is located.

21. The case of claim 1, wherein the second portion has an area that is no more than 50% of the area of the back of the RF communications device.

22. The case of claim 1, wherein the base is elongate and the second portion extends across at least 25% of a width of the base.

23. The case of claim 1, wherein the base and/or plurality of walls are adapted to produce a dielectric parameter adjacent an entire outer surface of the communication device to be relatively high, except for an area proximate the second portion of the communications device, when the communications device is disposed in the case.

24. The case of claim 1, wherein the base and/or plurality of walls have dimensions complementary to an extent of the second portion of the communications device, which produce the dielectric parameter adjacent the second portion of the communications device to be relatively low, when the communications device is disposed in the case.

25. The case of claim 1, wherein the base comprises at least two recess portions lower than a remaining portion of the base.

26. The case of claim 1, wherein the base comprises at least one recess portion lower than a remaining portion of the base.

27. An electronic device system, comprising:
a portable Radio Frequency (RF) communications device having an RF antenna arrangement internal to or integrated with an outer housing, the outer housing having an outer surface comprising:
a first portion, a first dielectric characteristics adjacent to the first portion having a relatively low effect on a frequency characteristic of the RF antenna arrangement; and
a second portion, a second dielectric characteristics adjacent to the second portion having a relatively high effect on the frequency characteristic of the RF antenna arrangement; and
a case comprising:
a base, dimensioned to fit a back of the RF communications device; and
a plurality of walls, extending from the base and dimensioned to fit corresponding walls of the RF communications device,
wherein the case is adapted to removably attach to the portable RF communications device; and
wherein, when the communications device is disposed in the case, the case is adapted to cover part of the first portion of the communications device so as to cause:
i. a dielectric parameter adjacent a part of the first portion of the communications device to be relatively high, and
ii. a dielectric parameter adjacent the second portion to be relatively low, and
wherein at least a part of the base to be adjacent the first portion of the communications device when the communications is disposed in the case, includes a casing material having a relatively high dielectric parameter, which thereby causes the dielectric parameter adjacent the first portion of the communications device to be relatively high, when the communications device is disposed in the case, wherein the casing material comprises a material with a permittivity of at least 3 and/or a loss tangent of greater than 0.05.

* * * * *